United States Patent
Roupe et al.

(10) Patent No.: US 9,487,151 B2
(45) Date of Patent: Nov. 8, 2016

(54) GLOVE BOX OWNER'S MANUAL/ELECTRONIC DEVICE STORAGE

(71) Applicant: FORD GLOBAL TECHNOLOGIES, LLC, Dearborn, MI (US)

(72) Inventors: Keith Daniel Roupe, Allen Park, MI (US); Randall Walter Lomako, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/551,140

(22) Filed: Nov. 24, 2014

(65) Prior Publication Data

US 2016/0144794 A1 May 26, 2016

(51) Int. Cl.
*B60R 7/06* (2006.01)

(52) U.S. Cl.
CPC .................... *B60R 7/06* (2013.01)

(58) Field of Classification Search
CPC ............. B60R 7/04; B60R 7/08; B60R 7/06
USPC ............. 296/37.12, 37.8, 37.1, 24.44
See application file for complete search history.

(56) References Cited

U.S. PATENT DOCUMENTS

| | | | | |
|---|---|---|---|---|
| 4,902,061 A * | 2/1990 | Plavetich | ............. | B60R 7/06 296/37.12 |
| 5,197,775 A * | 3/1993 | Reeber | ............. | B60R 7/06 296/37.12 |
| 6,315,436 B1 | 11/2001 | Schenk et al. | | |
| 8,740,278 B1 | 6/2014 | Mally | | |
| 2009/0266858 A1 * | 10/2009 | Vander Sluis | ............. | B60R 7/06 224/553 |
| 2009/0295183 A1 * | 12/2009 | Piekny | ............. | B60R 7/06 296/37.1 |
| 2011/0187145 A1 * | 8/2011 | Ishikawa | ............. | B60R 7/06 296/37.12 |

FOREIGN PATENT DOCUMENTS

| | | | | |
|---|---|---|---|---|
| DE | EP 1681205 A1 * | 7/2006 | ............. | B60R 7/06 |
| DE | 102008005622 A1 | 7/2009 | | |
| DE | 102008018559 A1 | 10/2009 | | |
| EP | 1681205 A1 | 7/2006 | | |
| FR | 2892990 A1 | 5/2007 | | |
| JP | 2005306134 A | 11/2005 | | |
| JP | 2009184443 A | 8/2009 | | |
| JP | 2010000971 A | 1/2010 | | |

OTHER PUBLICATIONS

English machine translation of DE102008005622.
English machine translation of DE102008018559.

(Continued)

*Primary Examiner* — Jason S Morrow
*Assistant Examiner* — E Turner Hicks
(74) *Attorney, Agent, or Firm* — Vichit Chea; King & Schickli PLLC

(57) ABSTRACT

A motor vehicle storage compartment includes a housing defining an interior storage space and a top having a cutout defining a rear lip for supporting at least a portion of an item. A pivoting front support is provided, configured to bias between an open position and a closed position. A retainer is provided to keep the front support in the closed position. When biased to the closed position, the front support defines a lip for supporting an opposed portion of the item. When biased the front support the open position, the item falls into the storage compartment interior storage space for retrieval.

17 Claims, 5 Drawing Sheets

(56) References Cited

OTHER PUBLICATIONS

English machine translation of EP1681205.

English machine translation of FR2892990.
English machine translation of JP2005306134.
English machine translation of JP2009184443.
English machine translation of JP2010000971.

* cited by examiner

GLOVE BOX OWNER'S MANUAL/ELECTRONIC DEVICE STORAGE

TECHNICAL FIELD

This disclosure relates generally to motor vehicles, and more particularly to an improved glove box design for a motor vehicle providing a supplemental storage space for storage of items such as motor vehicle owner's manuals, electronic devices, etc.

BACKGROUND

Storage space in the modern motor vehicle is at a premium. As an example, only a finite amount of space can be devoted to a vehicle glove box or glove compartment in order to accommodate other necessary and desired components typically included in the modern motor vehicle dashboard. Among the items typically stored in the vehicle glove box are items such as the owner's manual which the motor vehicle manufacturer is required to supply to the vehicle purchaser, consumer-owned electronic devices such as global positioning satellite (GPS) devices and music players, etc. These items can be quite bulky, and by themselves may occupy a significant portion of the available storage space in the glove box. Typically, even in the largest of motor vehicles the glove box is quickly filled up.

For this reason, attempts have been made to increase the available storage space of a glove box, or to improve the efficient utilization of that space. For example, structures such as secondary shelves and drop down shelves have been provided within the interior storage space of the glove box, to attempt to maximize the efficient use of the available space. However, these measures all suffer from the same problem, which is that they still occupy the interior storage space of the glove box and reduce the available space by the volume occupied by the secondary shelf as well as whatever item is placed thereon.

To solve these and other problems, the present disclosure relates to a motor vehicle glove box configured to allow use of a top thereof for storing certain items such as owners manuals, electronic devices, etc. Advantageously, by the glove box of this disclosure, such items can be stored in a manner easily accessible to a user, without reducing the limited storage space available in the glove box interior.

SUMMARY

In accordance with the purposes and benefits described herein, a motor vehicle storage compartment is provided, comprising a housing defining an interior storage space and including a top having a cutout defining a rear lip for supporting at least a portion of an item. A pivoting front support is provided, configured to bias between an open position and a closed position. A retainer is provided to keep the front support in the closed position. When biased to the closed position, the front support defines a lip for supporting an opposed portion of the item. The storage compartment may be a motor vehicle glove box.

In embodiments, the retainer may be an interference-fit retainer including paired cooperating tabs and notches associated with a front portion of the housing. In other embodiments, a spring clip is provided to bias the front support between the open and closed positions.

In other aspects, a motor vehicle glove box according to the foregoing description is provided.

In yet other aspects, a method for providing supplemental storage space in a motor vehicle is described, including providing a storage compartment according to the foregoing description. In use, an item such as a user owner's manual or electronic device is positioned whereby a portion of the item rests on the rear lip and biasing the front support to the closed position to support an opposed portion of the item. Biasing the front support to the open position causes the item to fall into the interior storage space for retrieval.

In the following description, there are shown and described embodiments of the disclosed motor vehicle glove box. As it should be realized, the glove box is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle fascia assembly, and together with the description serve to explain certain principles thereof. In the drawing.

Reference will now be made in detail to embodiments of the disclosed motor vehicle glove box assembly, examples of which are illustrated in the accompanying drawing figures.

DETAILED DESCRIPTION

Figure 1:
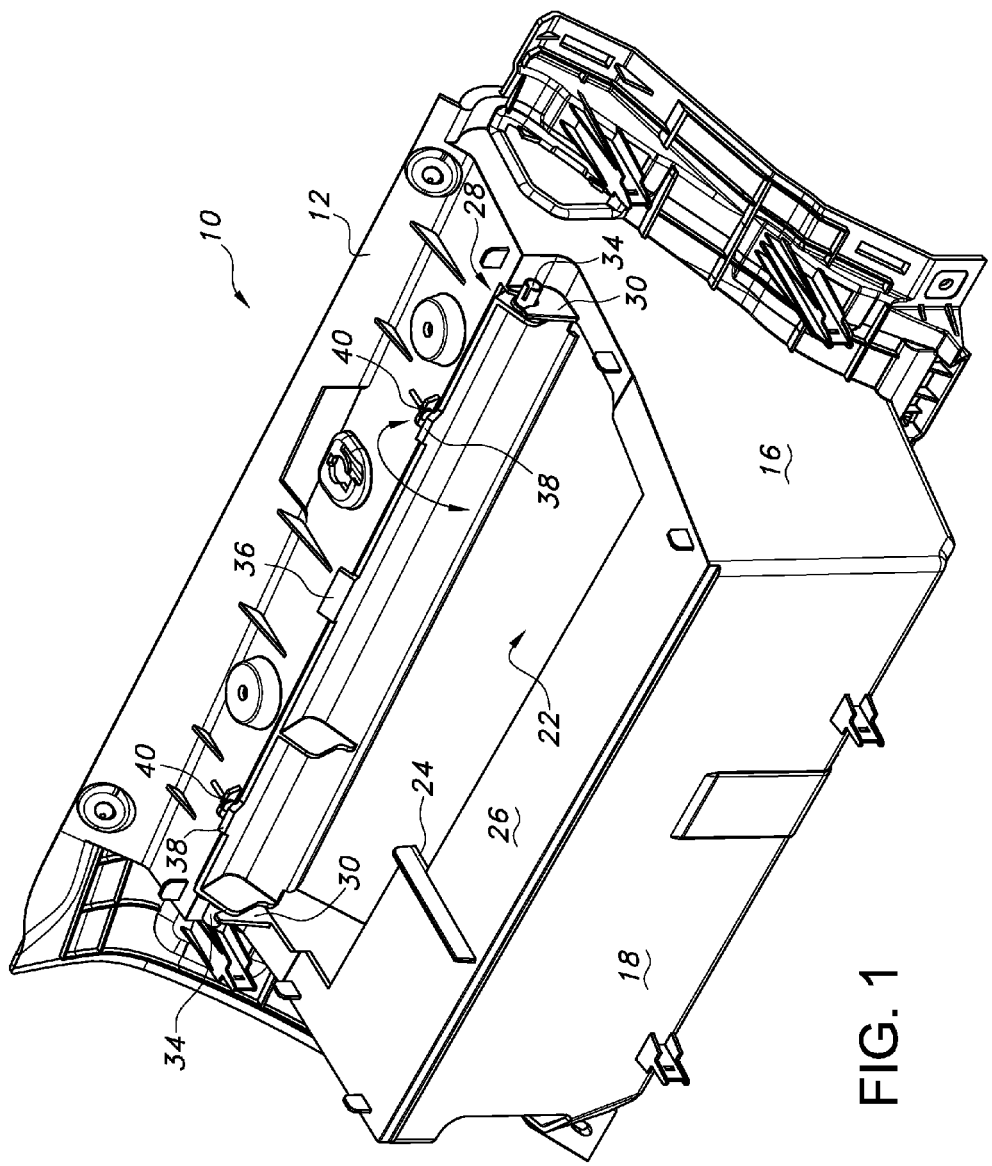
FIG. 1 is a top perspective view of the motor vehicle glove box assembly according to the present disclosure.

Reference is now made to FIG. 1 illustrating a motor vehicle storage compartment assembly 10, being in the depicted embodiment a glove box. Typically, the glove box includes a housing 12 defining a top 14, sides 16, and depending on specific configurations a back 18 and a bottom 20 (not shown in this view). The housing 12 defines an interior storage space 22. An access door 46 (not shown in this view; see FIG. 4) may be provided to allow or prevent access by a user to the interior storage space 22.

As depicted, the disclosed storage compartment assembly 10 top 14 includes a cutout 24 providing access therethrough to the interior storage space 22. The cutout 24 thus provides a lip 26 which may be used as an element of a supplemental storage area as will be described herein.

At an opposed end of top 14 relative to lip 26 is a pivoting front support assembly 28. The front support assembly 28 includes paired opposed posts 30 configured for receiving a pivoting door 32 whereby the door may be biased from an open position to a closed position (see arrows). Pins 34 at opposed ends of the pivoting door 32 are received in cooperating slots defined in opposed posts 30, providing a pivot point to allow pivoting the door 32. A tab stop 36 may be included on pivoting door 32 to prevent over rotation of the door.

A retainer assembly is provided to retain pivoting door 32 in the closed configuration. The retainer assembly may be an interference-fit retainer comprising at least one tab 38 on pivoting door 32, and a cooperating notch associated with the storage compartment housing 12. In one embodiment (see FIG. 1), a pair of tabs 38 and a pair of cooperating slots 40 are provided to retain door 32 in the closed position.

Figure 2:
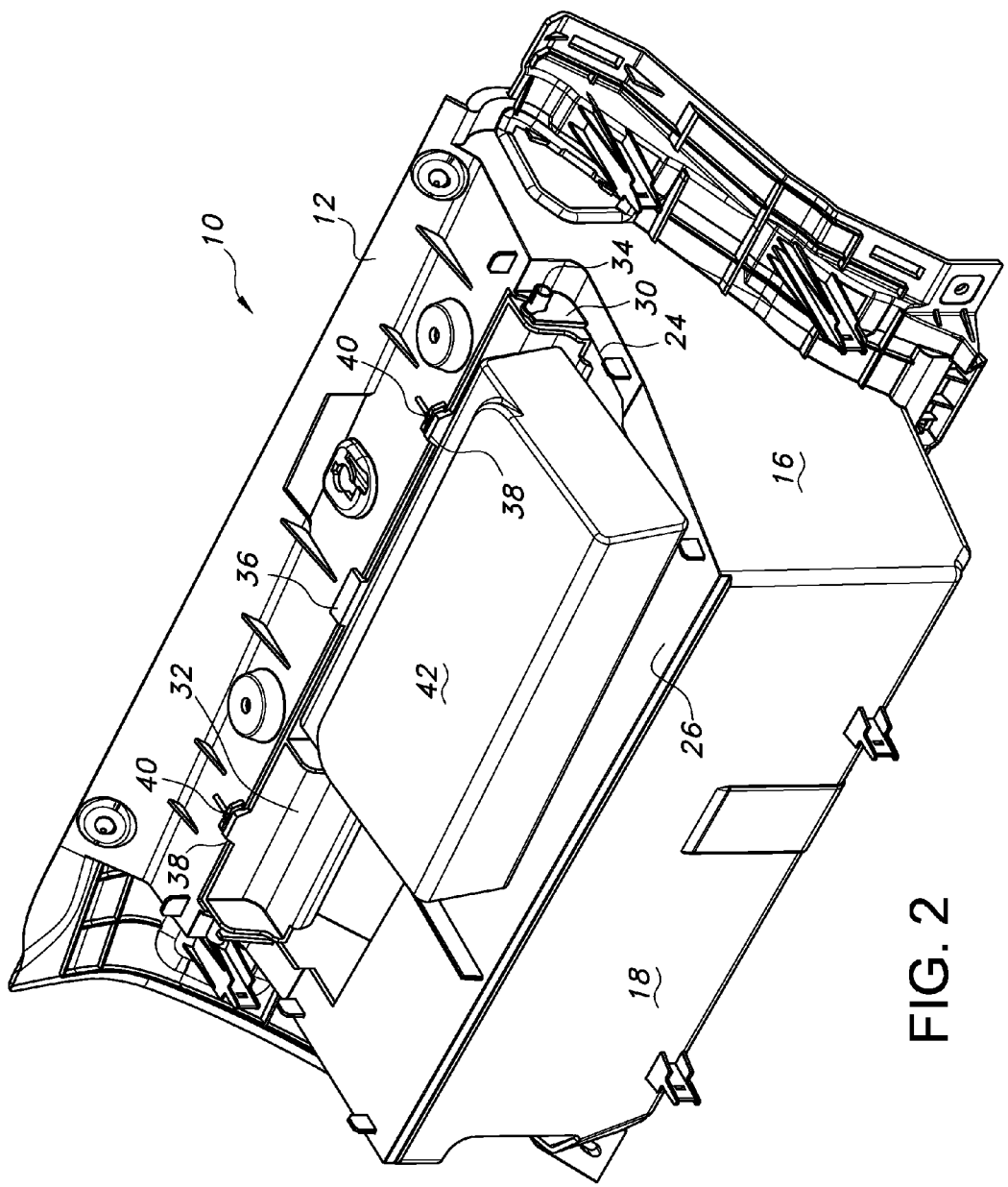
FIG. 2 shows an item stored in the supplemental storage space provided by the glove box of FIG. 1.
Figure 3:
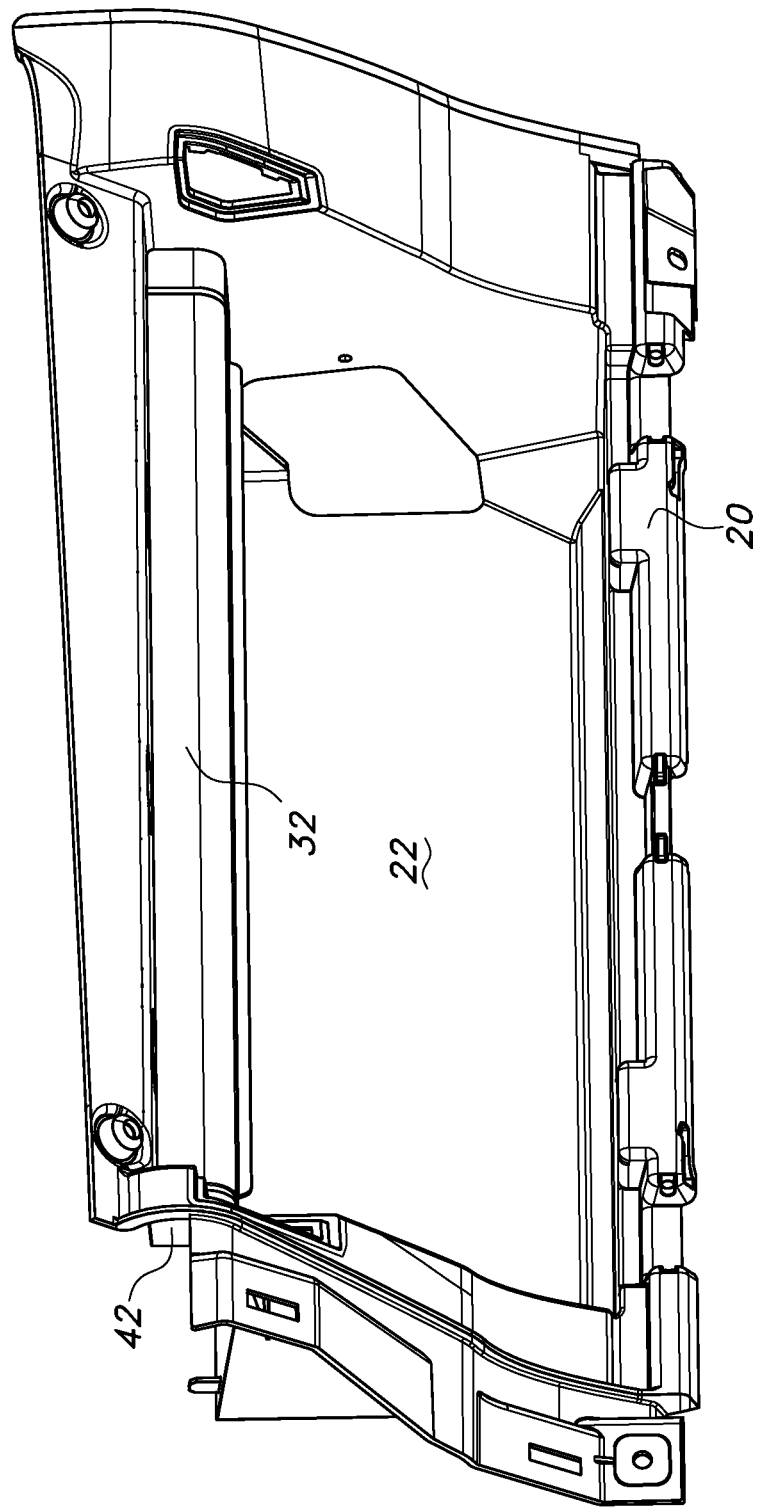
FIG. 3 is a front view of the supplemental storage space of FIG. 2 showing the front support in the closed position.

In use (see FIG. 2), an item to be stored such as a motor vehicle user's manual 42 is positioned such that a portion of the manual 42 rests on lip 26. The pivoting door 32 is then biased to the closed position, such that an opposed portion of the manual 42 rests on the closed pivoting door 32. In this manner, a supplemental storage area is provided for such items, without occupying any of the available space of interior storage space 22. See FIGS. 2 and 3.

Figure 4:
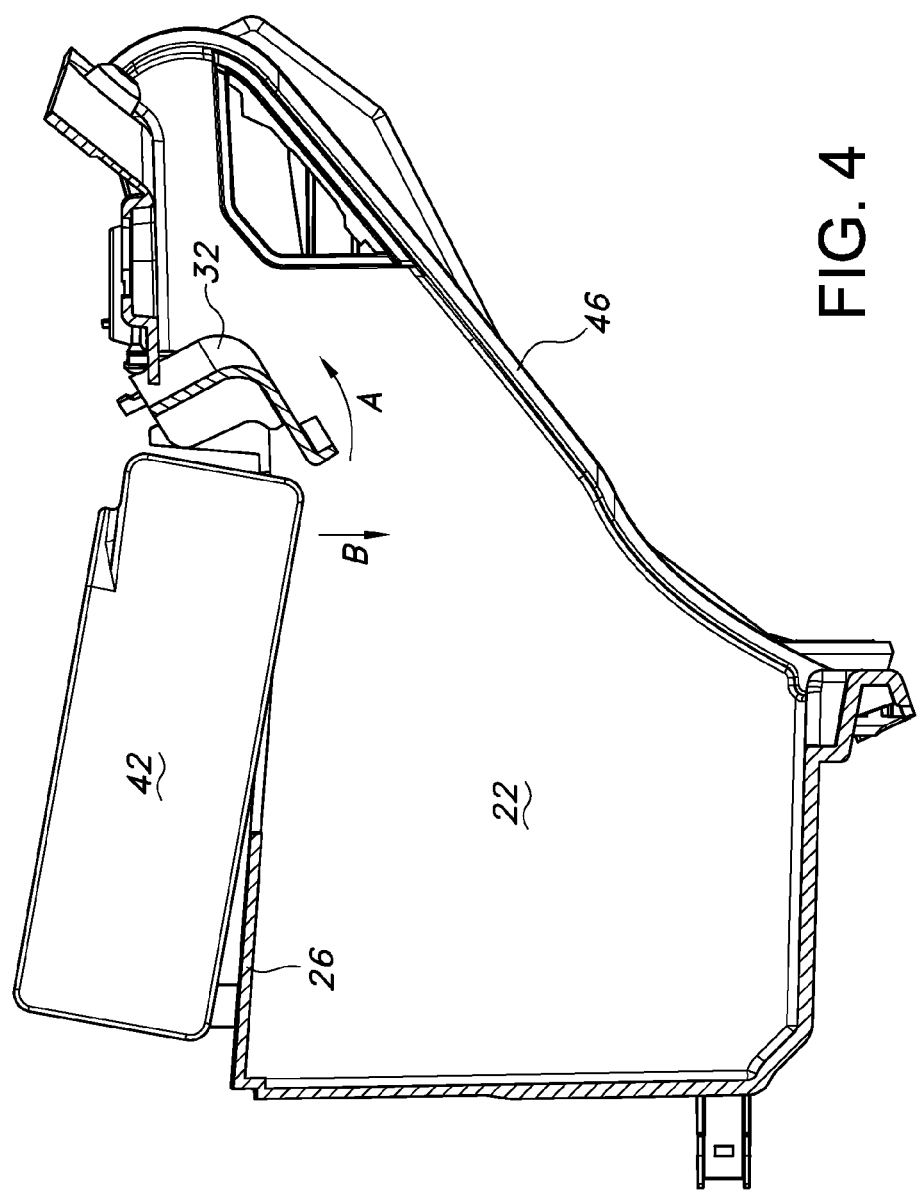
FIG. 4 is a side view showing removal of the item of FIG. 2 from the glove box.

To retrieve the manual 42, the user need only bias the pivoting door 32 to the open position (see FIG. 4, arrow A). Because only a relatively small portion of the manual 42 rests on lip 26, once the support provided by the pivoting door 32 is removed by opening it, the manual 42 simply falls (arrow B) into the interior storage space 22 for easy retrieval.

Figure 5:
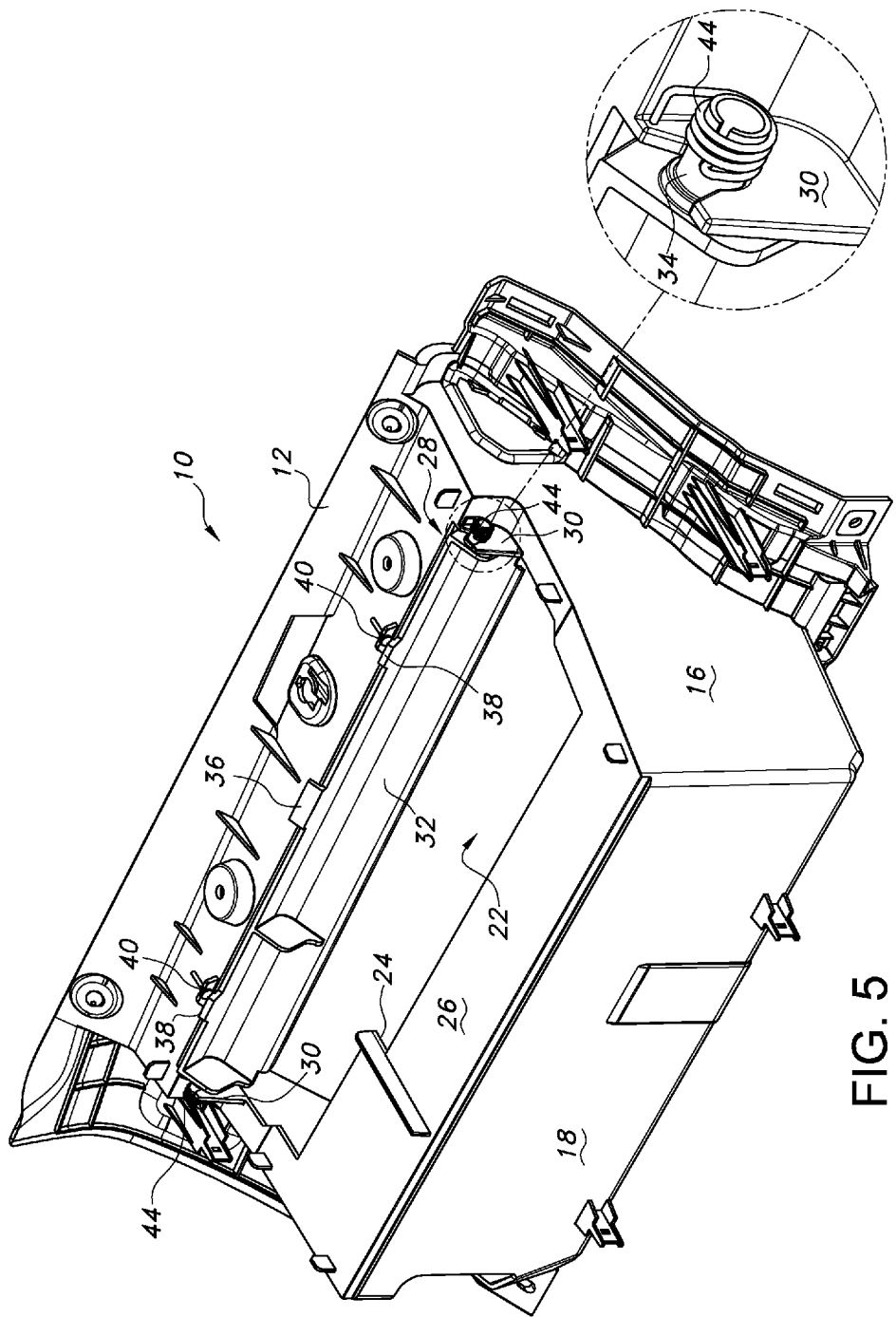
FIG. 5 shows an embodiment of the disclosed glove box assembly including a spring clip arrangement for biasing the supplemental storage front support between the open and closed positions.

In another embodiment of the pivoting front support assembly 28 (see FIG. 5), as set forth above the front support assembly 28 includes paired opposed posts 30 configured for receiving a pivoting door 32 whereby the door may be biased from an open position to a closed position (see arrows). Pins 34 at opposed ends of the pivoting door 32 are received in cooperating slots defined in opposed posts 30, providing a pivot point to allow pivoting the door 32. A tab stop 36 may be included on pivoting door 32 to prevent over rotation of the door. At least one spring clip 44 is provided in association with a pin 34 and a post 30, whereby the pivoting door 32 is continuously biased towards the closed position (see arrows). Thus, the user need only bias the pivoting door 32 to the open position to store an item such as user manual 42, and release the pivoting door 32. Spring clip 44 will automatically bias the pivoting door 32 to the closed position. To retrieve the manual 42, the user need only reverse the process. In the depicted embodiment (FIG. 5), paired spring clips 44 are associated with paired pins 34 and paired posts 30.

The benefits of the presently disclosed motor vehicle storage compartment assembly 10 are apparent. Useful, necessary, and/or desirable items such as user's manuals, GPS devices, and other electronic devices can easily be stored in the supplemental storage space provided by the disclosed configuration, without reducing the available space in the storage compartment interior storage space. Likewise, such items are easily retrievable.

Obvious modifications and variations are possible in light of the above teachings. For example, motor vehicle storage compartments such as glove boxes may come in a variety of exterior/interior configurations. All such modifications and variations are within the scope of the appended claims when interpreted in accordance with the breadth to which they are fairly, legally and equitably entitled.

What is claimed:

1. A motor vehicle storage compartment, comprising:
   a housing defining an interior storage space and including a top having a cutout defining a rear lip for supporting at least a portion of an item in a supplemental storage area;
   a front support assembly including a pivoting door configured to bias between a first open position and a first closed position, the pivoting door when biased to the first closed position supporting an opposed portion of the item and the pivoting door when biased to the first open position allowing the item to fall into the interior storage space; and
   an access door movable between a second open position and a second closed position for allowing or preventing access to the interior storage space.

2. The storage compartment of claim 1, wherein the storage compartment is a motor vehicle glove box.

3. The storage compartment of claim 2, further including a retainer for retaining the pivoting door in the first closed position.

4. The storage compartment of claim 3, wherein the retainer is an interference-fit retainer comprising at least one tab associated with the front support assembly and at least one cooperating notch associated with a front portion of the housing.

5. The storage compartment of claim 4, including a pair of tabs and a pair of cooperating notches.

6. The storage compartment of claim 3, wherein the pivoting door pivots on a pair of opposed pins received in a pair of cooperating posts, and a spring clip associated with at least one of the pins and at least one of the cooperating posts biases the pivoting door between the first open position and the first closed position.

7. The storage compartment of claim 6, including a spring clip associated with each of the pins and each of the cooperating posts.

8. A motor vehicle glove box, comprising:
   a housing defining an interior storage space and including a top having a cutout defining a rear lip for supporting at least a portion of an item in a supplemental storage area, said cutout providing access to the interior storage space for retrieval of said item;
   a front support assembly including a pivoting door configured to bias between a first open and a first closed position, the pivoting door when biased to the first closed position supporting at least an opposed portion of the item; and
   an access door movable between a second open and a second closed position for allowing or preventing access to the interior storage space.

9. The glove box of claim 8, further including a retainer for retaining the pivoting door in the first closed position.

10. The glove box of claim 9, wherein the retainer is an interference-fit retainer comprising at least one tab associated with the front support assembly and at least one cooperating notch associated with a front portion of the housing.

11. The glove box of claim 10, including a pair of tabs and a pair of cooperating notches.

12. The glove box of claim 9, wherein the pivoting door pivots on a pair of opposed pins received by a pair of cooperating posts, and a spring clip associated with at least one of the pins and at least one of the cooperating posts biases the pivoting door between the first open and the first closed position.

13. The glove box of claim 12, including a spring clip associated with each of the pins and each of the cooperating posts.

14. A method for providing a supplemental storage space in a motor vehicle, comprising:
   providing a storage compartment defined by a housing including a top, a bottom, and side walls defining an interior storage space;
   providing a cutout in the top defining a rear lip for supporting a portion of an item in the supplemental storage space; and
   providing a front support including a pivoting door configured to bias between an open position and a closed position, the pivoting door when biased to the closed position supporting an opposed portion of the item and the pivoting door when biased to the open position causing the item to fall into the interior storage space through the cutout for retrieval.

15. The method of claim 14, further including disposing the item whereby a portion rests on the rear lip and biasing the pivoting door to the closed position to support an opposed portion of the item.

16. The method of claim 14, further including providing a retainer for retaining the pivoting door in the closed position.

17. The method of claim 14, further including providing a pair of opposed pins received by a pair of cooperating posts, and a spring clip associated with at least one of the pins and at least one of the cooperating posts for biasing the pivoting door between the open and the closed position.

* * * * *